July 4, 1939.  J. F. LUHRS  2,165,182

MEASURING AND CONTROLLING APPARATUS

Filed Sept. 11, 1937  2 Sheets-Sheet 1

Inventor
JOHN F LUHRS
By Raymond W. Junkins
Attorney

July 4, 1939.  J. F. LUHRS  2,165,182

MEASURING AND CONTROLLING APPARATUS

Filed Sept. 11, 1937   2 Sheets-Sheet 2

Inventor
JOHN F. LUHRS
By Raymond D. Junkins
Attorney

Patented July 4, 1939

2,165,182

UNITED STATES PATENT OFFICE 2,165,182

MEASURING AND CONTROLLING APPARATUS

John F. Luhrs, Cleveland Heights, Ohio, assignor to Bailey Meter Company, a corporation of Delaware Application September 11, 1937, Serial No. 163,447

22 Claims. (Cl. 235—61)

This invention relates to apparatus for measuring and/or controlling the ratio between two variables which may be for example, pressures, temperatures, rates of flow, electromotive forces or any other physical, chemical or electrical condition or quantity. In any particular instance the variables may be the same, that is they may both be pressures for example, or they may be unlike one being a pressure and the other a temperature. The invention is equally applicable to the determination of the ratio between two abstract quantities, such as two numbers or mathematical functions, or between an arbitrary function or constant and a variable, as will be apparent from the description to follow:

In accordance with my invention a member is displaced from an initial position in accordance with the magnitude of each variable, and the ratio between the displacement of the members determined.

Further in accordance with my invention periodic electric impulses of a time length proportional to the magnitude of each variable are established and the measuring and/or controlling apparatus actuated in accordance with the difference in time length of said impulses.

Figure 1:
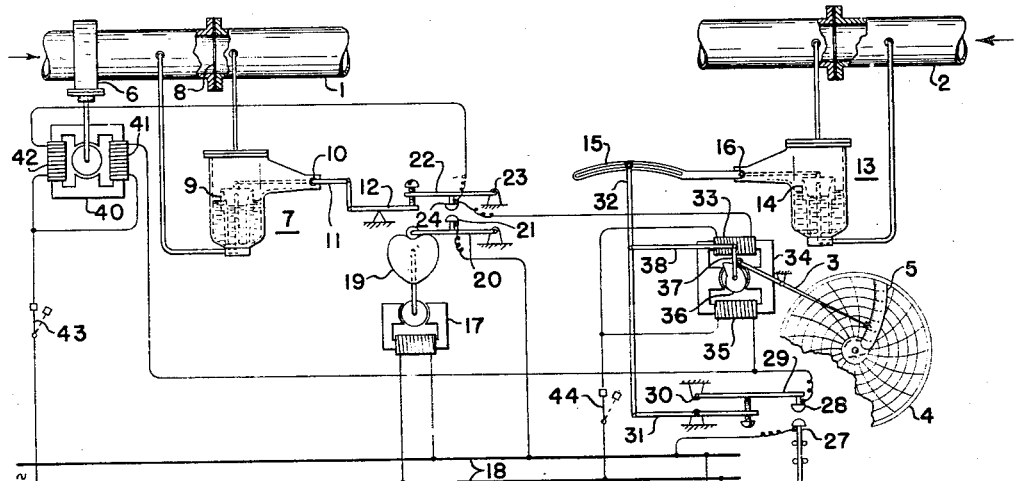
Fig. 1 illustrates diagrammatically one specific embodiment of my invention.

Referring to Fig. 1, I have therein shown my invention specifically applied to the determination and control of the ratio of the rate of flow of a first fluid passing through a conduit 1 in the direction of the arrow, to the rate of flow of a second fluid passing through a conduit 2 in the direction of the arrow. The actual ratio existing between the rates of flow of the first and second fluids is recorded by an index 3 on a chart 4 rotated by a suitable clock mechanism (not shown). The ratio may also be indicated by the index 3 in cooperation with a suitably graduated scale 5.

The rate of flow of the first fluid through the conduit 1 may be controlled by a valve means 6 to maintain substantially constant the ratio between the two rates of flow. Thus in the embodiment shown, the second fluid (flowing through the conduit 2) may be considered as the independent variable and the first fluid as the dependent variable. It will be apparent, however, that either or neither fluid may be controlled in conformance with the particular conditions pertinent to any given application, or that one fluid may be controlled indirectly, as by heating, cooling, or by varying the rate of application of an agent, or agents, producing or maintaining the flow of fluid.

It is, of course, evident that in many cases the control will be unnecessary and the apparatus hereinafter described utilized merely to exhibit the ratio existing between two independent variables. In other cases it may be desirable to utilize the apparatus merely to control a rate of flow of one fluid to maintain a predetermined ratio between the two fluids and the exhibiting apparatus may be dispensed with.

The rate of flow of fluid through the conduit 1 is measured by a rate of flow meter generally indicated at 7 sensitive to the differential produced by a primary element herein shown as an orifice 8. The meter 7 is illustrated as being of the type described in U. S. Patent 1,064,748 dated June 17, 1913, to J. W. Ledoux. Therein the differential pressure established by the orifice 8 is impressed across a liquid sealed bell 9 having walls of material thickness and so shaped that the vertical displacement of the bell from an initial position is directly proportional to the rate of flow of fluid and bears a non-linear functional relation to the differential pressure.

Angularly positioned by the bell 9 about a spindle 10 is a drive arm 11 pivotally connected to a fulcrumed lever 12. The arrangement is such that as the flow through the conduit 1 increases, the lever 12 is positioned in a counterclockwise direction in direct proportion thereto.

The rate of flow through the conduit 2 is measured by a meter generally indicated at 13 (similar to the meter 7) and having a liquid sealed bell 14 arranged to position an arcuate slotted drive arm 15 about a spindle 16. As the flow through the conduit 2 increases, the drive arm 15 is positioned in a counterclockwise direction.

In general, my invention contemplates establishing a first series of periodic electric impulses proportional in time length to the rate of flow through the conduit 1, a second series of electric impulses proportional in time length to the rate of flow through the conduit 2, and varying the proportionality between the second series of impulses and the rate of flow through the conduit 2 to maintain the impulses of the first and second series of equal time durations. To vary the proportionality between the second series of impulses and the rate of flow through the conduit 2 I vary the effective length of the slotted drive arm 15, and the effective length of the drive arm is then a measure of the ratio between the rates of flow, as will be apparent from the description to follow.

To periodically establish electric impulses having a time length corresponding to the rate of flow of fluid through the conduit 1 I show a synchronous motor 17 energized by a suitable source of alternating current 18 and rotating a substantially heart-shaped cam 19. The cam 19 periodically reciprocates a follower 20 carrying a contact 21.

Normally carried by the lever 12 is one end of a contact member 22, the other end of which is pivotally supported at 23. Carried by the member 22 is a contact 24. Once each revolution of the cam 19 the contact 21 engages the contact 24 lifting the contact member 22 from the lever 12 for an increment of time depending upon the position of the lever 12, or inferentially, depending upon the rate of flow of fluid through the conduit 1. As shown, the duration of the engagement of contacts 21 and 24 will vary inversely with the rate of flow of fluid through the conduit 1. It will be apparent, however, that any suitable mechanical arrangement for originating the electric impulses varying directly (or inversely) as the rate of flow of fluid may be employed.

To establish periodic electric impulses of a time duration corresponding to the rate of flow through the conduit 2 I provide a synchronous motor 25 energized from the source 18 and driving a cam 26 similar to the cam 19. The cam 26 periodically reciprocates a contact member 27 into engagement with a contact 28 carried by a lever 29 pivoted at 30.

Normally the lever 29 is supported by a fulcrumed lever 31 positioned through a link 32 by the drive arm 15. As the flow through the conduit 2 increases, the lever 29 is positioned in a counterclockwise direction, thereby decreasing the time duration of the engagement of contacts 27 and 28 during each revolution of the cam 26. That is to say, that as described with reference to the contacts 21 and 24, the contacts 27 and 28 are in engagement for a time length varying inversely as the rate of flow through the conduit 2.

The cams 19 and 26 are rotated in phase so that the position of contact 27 at all times corresponds with the position of contact 21. Engagement of contacts 27—28 will therefore occur simultaneously with engagement of contacts 21—24 if the rate of flow through the conduit 2 is equal to that through the conduit 1 and they will also disengage simultaneously. However, if the rate of flow through the conduit 2 is greater than that through the conduit 1, the contacts 27—28 will engage after and disengage prior to contacts 21—24. Conversely if the rate of flow through the conduit 1 is greater than that through the conduit 2 then the contacts 21—24 will engage after and disengage prior to contacts 27—28. It will be apparent that the difference in time length of the electric impulses established through engagement of contacts 21—24 and 27—28 will correspond to the difference in the rates of flow between the conduits 1 and 2.

Contacts 21—24 control a winding 33 of a self-starting synchronous motor 34 having a second winding 35 controlled by the contacts 27—28. Closure of contacts 21—24 serves to energize the winding 33, thereby tending to cause the motor 34 to rotate in one direction. Closure of contacts 27—28 serves to energize the winding 35, thereby tending to cause the motor 34 to rotate in opposite direction. During the increments of time when windings 33 and 35 are simultaneously energized on deenergized, the motor 34 does not rotate in either direction.

The motor 34 is provided with a self-contained gear reduction and serves to position a cam 36 against which the index 3 bears. Likewise positioned by the motor 34 is an arm 37 pivotally connected to the link 32 through a member 38.

When the electric impulses established through closure of contacts 21—24 and 27—28 are of equal time duration the motor 34 is not urged to rotation and index 3 and arm 37 remain stationary. If, however, the time duration of the impulse caused by closure of contacts 21—24 is greater than that caused through closure of contacts 27—28 the motor 34 rotates to position the index 3 relative to chart 4 and scale 5 and simultaneously to position the arm 37 to vary the effective length of the drive arm 15. Periodic operation of the motor 34 will continue until contacts 27—28 are again brought into engagement for the same increment of time as contacts 21—24, when again the motor 34 will remain stationary until there is a further change in the rate of flow of fluid through the conduits 1 or 2.

The cam 36, as will be readily appreciated by those skilled in the art, may be given any desired shape to correct for any non-linear functional relation which may exist between changes in the effective length of the drive arm 15 and changes in ratio between the rates of flow through the conduits 1 and 2. Through the agency of the cam 36 therefore, equal changes in ratio between the rates of flow of fluid will effect equal changes in the position of the index 3.

The valve 6 is shown arranged to be actuated by a motor diagrammatically indicated at 40 and having opposed windings 41 and 42. The winding 41 is energized through closure of contacts 27—28 whereas the winding 42 is energized through closure of the contacts 21—24. Energization of winding 41 serves to position the valve 6 in one direction and energization of the winding 42 in opposite direction. The valve 6 will accordingly be positioned periodically in proportion to changes in the ratio between the rates of flow of fluid through the conduits 1 and 2 and in a direction to prevent changes in the ratio. That is to say assuming a change in ratio by an increase in the rate of flow through the conduit 2, then the valve 6 will be periodically positioned in an opening direction to increase the rate of flow of fluid through the conduit 1 to restore the original ratio between the rates of flow of the fluids.

I show connected in the common wire from the motor 40 a switch 43 and in the common wire from the motor 34 a similar switch 44. If it is desired that the apparatus shown in Fig. 1 be used to exhibit the magnitude of the ratio only, then the switch 43 may be thrown to the open position as shown in dotted line, and thereafter the valve 6 will remain stationary. Conversely the apparatus may be utilized to control only by throwing the switch 44 to open position. Thereafter the link 32 will not be positioned relative to the drive arm 15, so that the motor 40 will periodically be positioned to maintain a predetermined ratio between the rates of flow through the conduits 1 and 2 corresponding to the then existing length of the drive arm 15. For example, assuming that the rate of flow through the conduit 2 remains constant, but that the rate of flow through the conduit 1 increases, then periodically thereafter the motor 40 will be positioned for an increment of time proportional to the change in the rate of flow of fluid through the conduit 1 until the predetermined ratio is established. By positioning the link 32 relative to the drive arm 15 the apparatus may be made to maintain any desired ratio between the rates of flow of fluid through the conduits 1 and 2.

Figure 2:
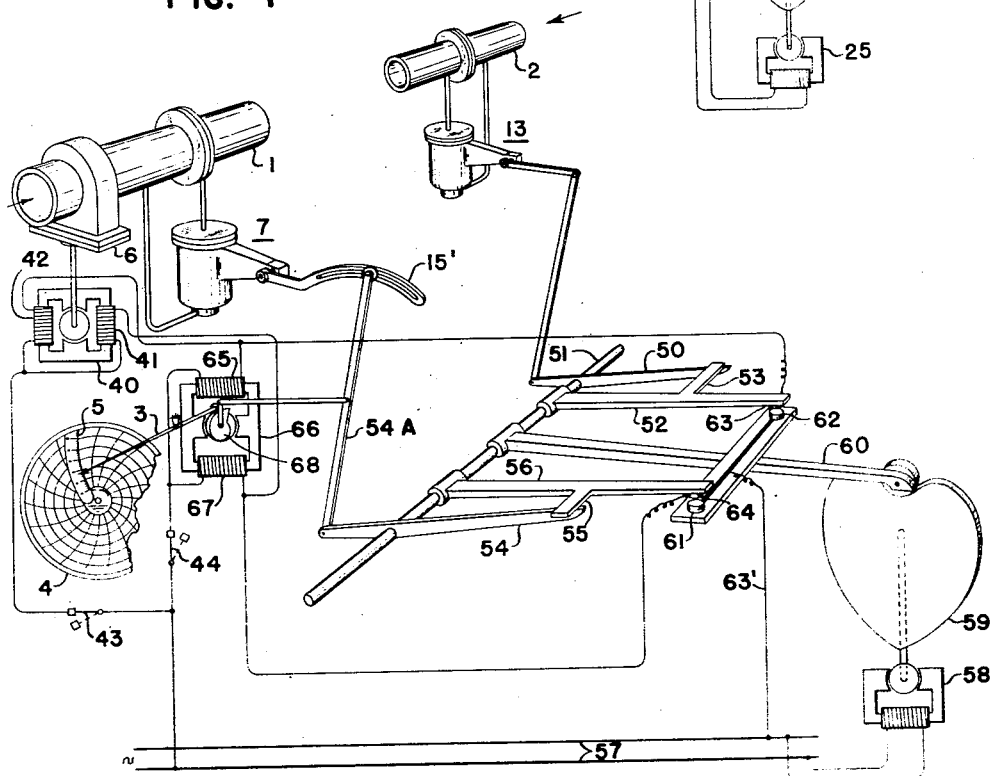
Fig. 2 illustrates diagrammatically a modified form of my invention as shown in Fig. 1.

The embodiment of my invention shown in Fig. 1 may be utilized regardless of the distance by which the conduits 1 and 2 are separated, for between the meter 7 responsive to the rate of flow through the conduit 1 and the meter 13 responsive to the rate of flow through the conduit 2 merely electrical conductors are utilized. In Fig. 2 I show a modified form of my invention, which may be conveniently employed when the conduits 1 and 2 lie adjacent each other, making it feasible to employ mechanical linkage between the meters 7 and 13. For the sake of clarity I have shown the embodiment of my invention illustrated by Fig. 2 in isometric projection with certain parts distorted as to size, as will be obvious to those skilled in the art.

In the embodiment of my invention shown in Fig. 2 the meter 13 angularly positions a lever 50 about a shaft 51. Likewise supported by the shaft 51 is an arm 52 having a laterally extending projection 53 normally resting on the lever 50.

The meter 7 angularly positions an arcuately slotted arm 15' similar to the arm 15 of Fig. 1. A lever 54 is positioned about the shaft 51 by the arm 15' through a depending link 54A. Normally resting on the lever 54 is a laterally extending projection 55 of an arm 56 pivoted about the shaft 51. As the rates of flow through the conduits 1 and 2 vary, the levers 50 and 54 are positioned in consonance therewith. Specifically, as the rates of flow increase the levers 50 and 54 are positioned in a counterclockwise direction about the shaft 51 and as the flows decrease they are positioned in a clockwise direction.

Energized by a suitable source 57 is a synchronous motor 58 driving a substantially uniform rise cam 59. Periodically reciprocated by the cam 59 is a follower 60 pivotally supported by the shaft 51 and carrying contacts 61 and 62 connected through a wire 63' with the source 57.

The arm 52 carries a contact 63 and the arm 56 a contact 64. Once each revolution of the cam 59 contact 62 engages contact 63 and contact 61 engages contact 64. Closure of contacts 62—63 serves to energize a winding 65 of a motor 66. Closure of contacts 61—64 serves to energize an opposed winding 67 of the motor 66. Energization of the winding 65 serves to rotate the motor 66 in one direction and energization of winding 67 serves to rotate the motor 66 in opposite direction. When windings 65 and 67 are simultaneously energized or deenergized the motor 66 is not urged to rotation.

The motor 66 serves to position the index 3 and simultaneously and in consonance therewith to position the link 54A relative to the drive arm 15' as explained with reference to link 32 and arm 15 of Fig. 1.

Assuming that the apparatus disclosed in Fig. 2 is in equilibrium, then contacts 62—63 and 61—64 will engage and disengage simultaneously, so that the motor 66 will not be urged to rotation in either direction. Assuming now that there is an increase in the rate of flow through the conduit 1 then contacts 62—63 will engage prior to and disengage after contacts 61—64. During the increments of time when contacts 62—63 only are engaged, the motor 66 will move in a direction to restore simultaneous engagement and disengagement of contacts 61—64 with contacts 62—63. Simultaneously with such operation the index 3 will be positioned relative to the chart 4 and scale 5 to record and indicate the ratio and change in ratio.

Conversely upon a decrease in the rate of flow through the conduit 1 the contacts 61—64 will engage prior to and disengage after contacts 62—63, thereby causing through sole energization of winding 67 rotation of motor 66 in opposite direction, again positioning the link 54A relative to the drive arm 15' to restore simultaneous engagement and disengagement of contacts 61—64 and 62—63.

As shown and as explained with reference to Fig. 1, the motor 66 is arranged to actuate the index 3 through a suitably shaped cam 68, so that while the index 3 is positioned in proportion to changes in the effective length of drive arm 15, direct proportionality does not exist, so that movements of the index 3 may be made directly proportional to changes in the ratio between the rates of flow of fluid through the conduits 1 and 2 regardless of the existing functional relation between changes in effective length of drive arm 15' and changes in ratio.

The embodiment of my invention shown in Fig. 2 may be utilized to control the rate of flow of fluid through one of the conduits to maintain a predetermined ratio between the rates of flow therein. In Fig. 2 I show apparatus similar to that disclosed in Fig. 1 for controlling the rate of flow of fluid through the conduit 1. Arranged to be energized by contacts 61—64 and 62—63 is the motor 40 having opposed windings 41 and 42. As shown, the winding 42 is arranged to be energized by closure of contacts 62—63 and the winding 41 through the closure of contacts 61—64.

In the neutral connectors to the motors 66 and 40 are shown switches 44 and 43 respectively, so that the apparatus disclosed in Fig. 2 may be used to merely exhibit the ratio between the rates of flow of fluid through the conduits 1 and 2, to simultaneously exhibit and control the ratio between the rates of flow of fluid or to merely control the ratio between the rates of flow of fluid.

Figure 3:
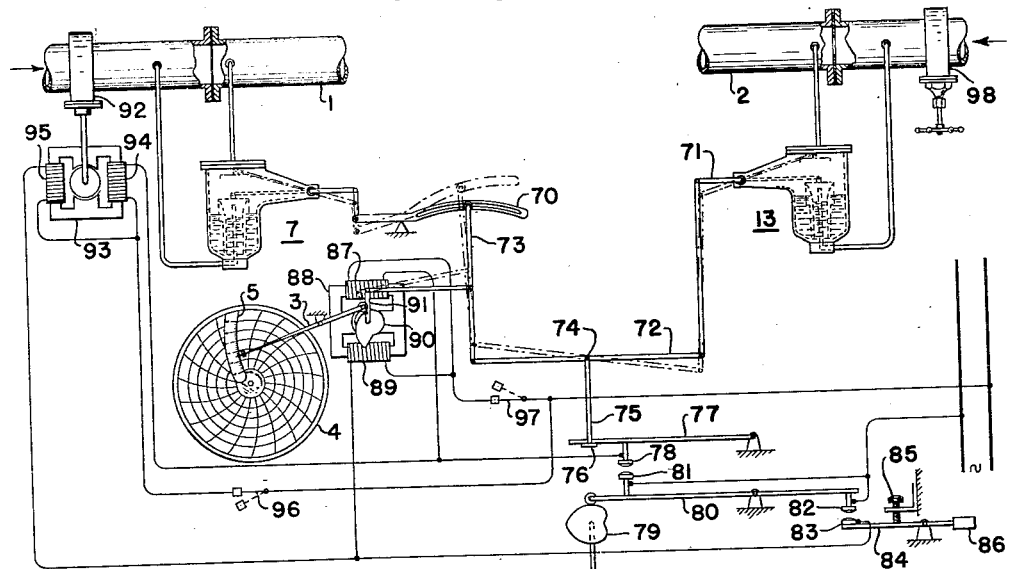
Fig. 3 illustrates diagrammatically a further embodiment of my invention.

In Fig. 3 I show a further embodiment of my invention wherein I periodically establish electric impulses of a time length varying in accordance with changes in the ratio between the rates of fluid flow (i. e. a plurality of variables) and then vary the effective length of a drive arm or member until said periodic electric impulses are again made equal to electric impulses of a predetermined time length. Referring to Fig. 3 I therein show the rate of flow of fluid through the conduit 1 measured by the meter 7 and the rate of flow of fluid through the conduit 2 measured by the meter 13. The meter 7 positions a slotted arcuate drive arm 70 in accordance with changes in the rate of flow through the conduit 1. The meter 13 positions a drive arm 71 in accordance with changes in the rate of flow of fluid through the conduit 2. The slotted arcuate drive arm 70 and drive arm 71 jointly position a differential beam 72.

Movements of the arm 70 are transmitted to the beam 72 through a link 73 movable relative to the slotted drive arm 70. So long as the flows through the conduits 1 and 2 remain equal or in predetermined ratio to each other, then the mid point 74 of the beam 72 will remain in a predetermined position. If the flow through the conduit 1 increases above that through the conduit 2, then the mid point 74 will move upward an amount proportional to the difference. Conversely if the flow through the conduit 2 increases above that through the conduit 1, then the mid point 74 will be positioned downwardly from the position shown an amount proportional to the difference.

Pivotally connected to the mid point 74 is a member 75 having a laterally extending foot 76 normally supporting one end of a pivoted lever 77 carrying a contact 78. The contact 78 will accordingly be positioned about the pivot support of the lever 77 in accordance with changes in the difference between the rates of flow through the conduits 1 and 2.

Arranged to be periodically reciprocated at a substantially uniform time rate by a cam 79 is a pivoted lever 80 carrying a contact 81. Accordingly, contacts 81 and 78 will periodically engage for a time increment depending upon the vertical position of the mid point 74. Also carried by the lever 80 is a contact 82 arranged to engage a contact 83 carried by a lever 84 normally held against an adjustable stop 85 by a suitable counterweight 86. Once during each revolution of the cam 79, contact 82 will engage contact 83 for a predetermined increment of time, which may be varied by adjustment of the stop 85.

The contacts 78—81 control a winding 87 of a self-starting synchronous motor 88, the opposed winding 89 of which is controlled by contacts 82—83. Positioned through a cam 90 by the motor 88 is the index 3 and the motor also positions an arm 91 which controls the position of the link 73 in the arcuate slot in drive arm 70.

If contacts 78—81 and 82—83 engage for the same increment of time during each revolution of the cam 79, then the motor 88 remains stationary. However, upon a change in flow through the conduits 1 or 2 the duration of closure of contacts 78—81 will vary, thereby causing the motor 88 to be positioned in one direction or another. Such positioning of the motor 88 will result in a corresponding positioning of the index 3, and of link 73 in the slotted drive arm 70. Periodic operation of the motor 88 will thus occur until the duration of closure of contacts 78—81 again corresponds to the duration of closure of contacts 82—83. This status will occur when the mid point 74 has been restored to a predetermined position through the movement of the link 73 along the drive arm 70. The effective length of the drive arm 70 is then a measure of the ratio of the rates of flow fluid through the conduits 1 and 2 and the index 3 moving in consonance with the link 73 is therefore positioned in accordance with the ratio. As described with reference to Figs. 1 and 2 the cam 90 may be given any desired shape so that movements of the index 3 will be directly proportional to changes in ratio or in any desired relation thereto.

The rate of flow of fluid through either the conduits 1 and 2 may be controlled as explained with reference to Figs. 1 and 2. In the embodiment shown in Fig. 3 I show the flow of fluid through the conduit 1 adapted to be controlled by a valve 92 actuated by a motor 93 having opposed windings 94 and 95. Contacts 82—83 serve to energize the winding 95 whereas the winding 94 is energized by closure of contacts 78—81. In the common connector to the motor 93 is a switch 96 and in the common connector to the motor 88 is a similar switch 97. With switches 96 and 97 closed motors 88 and 93 are operated simultaneously in parallel. With the switch 96 opened the motor 93 will remain stationary and the apparatus shown, merely record and indicate the ratio existing between the rates of flow of fluids in the conduits 1 and 2. With the switch 97 open and the switch 96 closed, then the apparatus will merely regulate the rate of flow of fluid through the conduit 1 to maintain a predetermined ratio with respect to the flow through conduit 2.

If the flow through the conduit 2 is maintained constant at some predetermined value by any suitable means herein shown as a manually actuated valve 98, then the apparatus disclosed in Fig. 3 will operate to maintain the rate of flow of fluid through the conduit 1 in predetermined ratio thereto or to maintain the rate of flow at a constant magnitude. Accordingly, as will be apparent to those familiar with the art, the apparatus I have shown in Fig. 3 may be utilized to maintain a rate of flow of fluid or other variable at any predetermined desired value.

Figure 4:
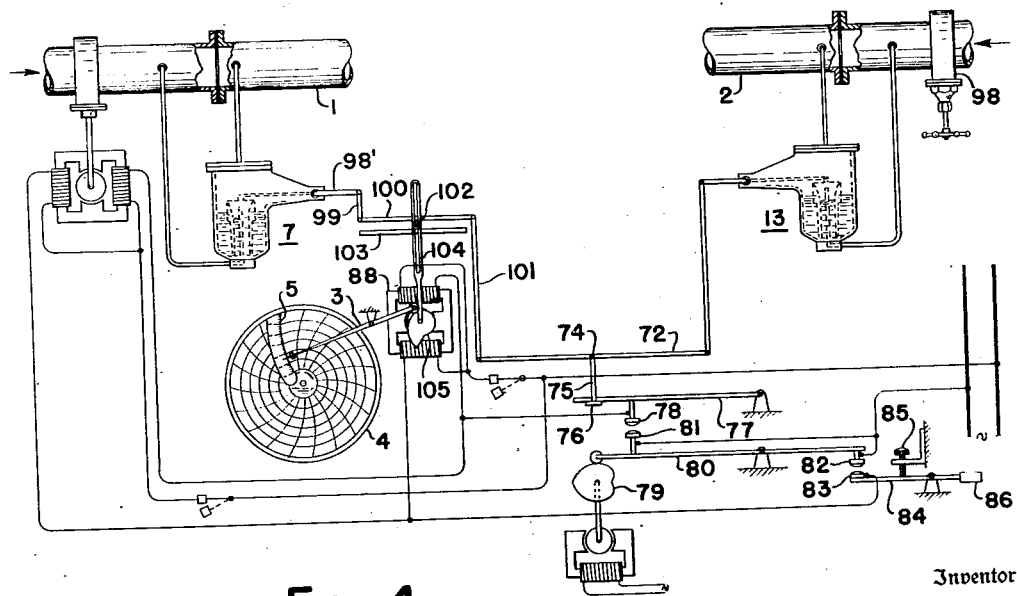
Fig. 4 illustrates diagrammatically a further modified form of my invention.

In Fig. 4 I show an embodiment of my invention somewhat similar to that shown in Fig. 3 but employing a modified arrangement for varying the positioning of the differential beam 72 by the meter 7. Therein the meter 7 positions a drive arm 98', which is pivotally connected by a link 99 to a horizontal lever 100. Movements of the lever 100 are transmitted to the differential beam 72 through a link 101.

The lever 100 is angularly positioned about a movable fulcrum 102 carried by a stationary support 103 and slidable vertically in a slotted link 104 angularly positioned by the motor 88.

Upon a change in the rate of flow through either the conduits 1 or 2, indicating a change in the ratio between the rates of flow, the slotted drive arm 104 is angularly positioned by the motor 88, thereby moving the fulcrum 102 along the support 103 and varying the vertical position of the link 101 and accordingly the mid-point 74 for a given rate of flow through the conduit 1. Such periodic movements of the motor 88 and resulting movement of the fulcrum 102 will continue until the midpoint 74 has been restored to the predetermined vertical position, as explained with reference to Fig. 3.

The index 3 is moved relative to the chart 4 and scale 5 by the motor 88 through a suitably shaped cam 105 so that movement thereof will be directly proportional to changes in ratio rather than directly proportional to changes in position of the fulcrum 102.

It is apparent that in any of the embodiments of my invention shown, any desired range in ratios may be measured. For example, referring to Fig. 1, the arcuate slot in drive arm 15 may be of such design that a change in ratio of from 0.5 to 1.5 is required to position the link 32 from one end to the other. By changing the size of the orifice 8 relative to the size of the orifice in conduit 2 so that a greater or lesser flow is required to position the meter 7 through its travel, the range in ratios through which my device is operative, may be easily changed to meet the particular conditions pertinent to any particular case. As will be readily appreciated by those familiar with the art, in the event that from time to time material changes in the basic ratio between the flows through conduits 1 and 2 occur, the orifice 8 may be made adjustable but upon such changes in the basic ratio the size of the orifice 8 may be varied to maintain the apparatus within its operative limits.

While I have described certain specific embodiments of my invention, it will be apparent that further modifications may be made without departing from its scope and that therefore such embodiments of my invention as I have chosen to describe should be taken as merely illustrative and not as limiting.

What I claim as new, and desire to secure by Letters Patent of the United States, is:—

1. Apparatus for determining the ratio between two variables comprising a lever angularly displaced about a fulcrum from an initial position in accordance with the magnitude of each variable, means for periodically establishing electric impulses of a time length proportional to the displacement of a predetermined point on one of said levers from the initial position, means for periodically establishing electric impulses of a time length proportional to the displacement of a selected point on the other of said levers, and means under the joint control of said impulses for varying the point selected on said last named lever until said impulses are of identical length, whereby the radial distance of said finally selected point from the fulcrum is a measure of the ratio of said variables.

2. Apparatus for determining the ratio between two variables comprising a drive arm angularly positioned about a center in accordance with changes in the magnitude of one variable, means for periodically establishing electric impulses in accordance with the displacement of a given point on said drive arm from an initial position, a variable length drive arm angularly positioned from an initial position in accordance with changes in the magnitude of the second variable, means for periodically establishing electric impulses of a time length proportional to the displacement of said variable length drive arm from the initial position, and means under the control of said impulses for varying the length of said variable length drive arm until said impulses are of identical time length when the length of said variable length drive arm is a measure of the ratio between said variables.

3. Apparatus for determining the ratio between two variables comprising a first lever angularly positioned about a center in accordance with the magnitude of one variable, a second lever angularly positioned about a center in accordance with the magnitude of the other of said variables, a motor having opposed windings, means for periodically energizing one of said windings for increments of time proportional to the displacement of said first lever, means for periodically energizing the opposed winding for increments of time proportional to the displacement of said second named lever, and means under the control of said motor for varying the length of said second named lever until said windings are energized for equal increments of time whereby the length of said second named lever is a measure of the ratio between said variables.

4. Apparatus for determining the ratio between two variables comprising a first lever angularly positioned about a center in accordance with the magnitude of one variable, a second lever angularly positioned about a center in accordance with the magnitude of the other of said variables, means for periodically establishing electric impulses in accordance with the product of the magnitude of the first variable multiplied by the length of said first lever, means for establishing electric impulses in accordance with the products of the magnitude of the other variable multiplied by the length of said second lever, and means for varying the length of said second lever under the control of said impulses to maintain said impulses identical whereby the length of said second drive arm is a measure of the ratio between said variables.

5. Apparatus for determining the ratio between two variables comprising means for periodically establishing electrical impulses of a time length bearing a functional relation to one of said variables, means for periodically establishing electric impulses of a time length bearing a functional relation to the other of said variables, means under the control of said impulses for varying the functional relation between the time length of said second named impulses and the magnitude of said other of said variables, and indicating means positioned by said last named means.

6. Apparatus for determining the ratio between two variables comprising means for periodically establishing electric impulses of a time duration bearing a predetermined ratio to the magnitude of one of said variables, means for periodically establishing electric impulses of a time duration bearing a predetermined ratio to the magnitude of the other of said variables, means under the control of said electric impulses for varying the ratio between the time lengths of said second named impulses to the other of said variables to maintain said impulses of similar lengths, and indicating means positioned by said last named means.

7. In an apparatus for determining the ratio between two variables, in combination, means for periodically establishing electric impulses of a time duration proportional to one of said variables, means for periodically establishing electric impulses of a predetermined duration, and means for varying the proportionality between the magnitude of said one of said variables and said first named impulses to maintain said first and second impulses of identical time duration.

8. Apparatus for determining the ratio between two variables comprising, a motor having opposed windings, means for periodically energizing one of said windings for increments of time proportional to one of said variables, means for periodically energizing the other of said windings for increments of time proportional to the other of said variables, and means for varying the proportionality between the time duration of said first named impulses and variable to maintain the time duration of said first and second named impulses equal.

9. Apparatus for determining the ratio between two variables comprising, an electric motor having opposed windings, means periodically for time increments proportional to the magnitude of one of said variables energizing one of said windings, means periodically for increments of time proportional to the magnitude of the other of said variables energizing the other of said windings, and means under the control of said motor for varying the time length of the periodic energizations established by said first named means.

10. In apparatus for determining the ratio between two variables, in combination, a member jointly positioned by said variables, means for varying the positioning of said member by one of said variables, means for periodically establishing electric impulses of constant time lengths, means for establishing electrical impulses of a time length proportional to the position of a predetermined point on said beam, and means under the control of said impulses for actuating said first named means to maintain said second named impulses equal in time length to said first named impulses.

11. In apparatus for determining the ratio between two variables, in combination, means for periodically establishing electric impulses of a time duration proportional to changes in said ratio, means for periodically establishing electric impulses of a constant time length, means under the joint control of said impulses for varying the time length of said first named impulses to maintain the time length of said first named impulses in desired proportionality to said second named impulses.

12. In apparatus for determining the ratio between two variables, in combination, means for periodically establishing electric impulses having a predetermined time length when a given ratio exists between said variables, and a different time length upon departure of said variables from the given ratio, means for establishing electric impulses of a time length corresponding to said impulses of predetermined lengths, an electric motor having opposed windings under the joint control of said impulses for controlling said first named means to maintain said impulses at the predetermined value, and indicating means under the control of said motor.

13. In apparatus for determining the ratio between two variables, in combination, a first member movable in proportion to one of said variables, a second member movable in proportion to the other of said variables, a differential link connecting said members for establishing electric impulses of a time length proportional to the position of a point on said first member, means for establishing electric impulses of a predetermined time length corresponding to the time length of said first named impulses when said point is in predetermined position, and means for varying the ratio of movements of said first named member in response to changes in said one of said variables under the joint control of said first and second named impulses.

14. Ratio determining apparatus comprising in combination, means for establishing periodic electric impulses of a time duration proportional in magnitude to a first variable, means for establishing periodical electric impulses of a time duration proportional to the magnitude of a second variable, and means under the joint control of said electric impulses for maintaining said impulses of equal time duration.

15. Apparatus for maintaining a constant ratio between two variables comprising in combination, means for periodically establishing electric impulses of a time length variable in dependence upon changes in the ratio between said variables, means for establishing periodic electric impulses of a time length corresponding with the desired ratio between said variables, and means under the joint control of said impulses for varying one of said variables to maintain the time duration of said electric impulses in predetermined ratio.

16. In an apparatus for determining the ratio between two variables, in combination, means for periodically establishing electric impulses of a predetermined time duration, means for periodically establishing electric impulses of a duration variable from said first named impulses in accordance with changes in said ratio, and means under the joint control of said impulses adapted to alter the duration of said second named impulses so as to restore said impulses to equality.

17. In an apparatus for determining the ratio between two quantities, in combination, means for periodically establishing two impulses having a difference in time duration corresponding to changes in ratio between said quantities, means under the joint control of said impulses for varying the proportion between one of said quantities and one of said impulses to restore said impulses to equal time duration whereby said change in proportion is a measure of the change in ratio between said quantities.

18. Apparatus for determining the ratio between two quantities, comprising in combination, means for periodically establishing electric impulses of a predetermined time duration, means for periodically establishing electric impulses variable in time duration from the duration of said first named impulses in accordance with changes in the ratio between said quantities, and means jointly responsive to said impulses for varying the proportionality between said second named impulses and one of said quantities to restore said impulses to equal time duration, whereby said change in proportionalities becomes a measure of the change in ratio.

19. Apparatus for determining the ratio between two quantities, comprising, means for periodically establishing electric impulses of a predetermined time duration, means for periodically establishing electric impulses variable in time duration in accordance with changes in the ratio between said quantities, and means jointly responsive to said impulses for varying the time duration of said last named impulses to maintain said first and second impulses of equal time duration.

20. Apparatus for determining the ratio between two quantities comprising, a motor having opposed windings, means for periodically energizing one of said windings for predetermined increments of time, means for energizing the other of said windings for increments of time proportional to at least one of said quantities, and means actuated by said motor for varying the proportionality between said second named impulses and one of said quantities to maintain said impulses equal in time duration.

21. A torque amplifying mechanism for positioning an output shaft in correspondence with the magnitude of a variable, comprising in combination, a motor having opposed windings which when simultaneously energized do not urge said motor to rotation, but when either is energized alone urges the motor to rotation in opposite direction each from the other, an electric circuit for each of said windings, an output shaft driven by said motor, a first contact member positioned in correspondence with the magnitude of the variable and connected in circuit with one of said windings, a second contact member connected in circuit with the other of said windings and operatively connected to said output shaft and positioned in correspondence with the position thereof, a cam, means for rotating said cam through a series of successive cycles, a circuit closer reciprocated by said cam and arranged to engage each of said contact members for a portion of each cycle corresponding to the position thereof whereby said motor is rotated during each cycle an amount corresponding to the difference in time duration of engagement of said circuit closer with said contact members and said second contact member is positioned in a sense to restore correspondence of position with said first contact member.

22. In a torque amplifying mechanism for positioning an output shaft in correspondence with the magnitude of a variable, in combination, a shaft, a first member pivotally mounted on said shaft and angularly positioned about said shaft in correspondence with changes in the magnitude of a variable, a motor, an output shaft driven by said motor, a winding for said motor which when energized urges said motor to rotation in predetermined direction, an opposed winding for said motor which when energized urges said motor to rotation in opposite direction and when both said windings are energized said motor is not urged to rotation, a second member pivotally mounted on said shaft and angularly positioned about said shaft in correspondence with changes in the position of said output shaft, a first contact arm pivotally mounted on said shaft and normally resting on said first member, a second contact arm pivotally mounted on said shaft and normally resting on said second member, a circuit closer pivotally mounted on said shaft, means for reciprocating said circuit closer through a series of successive cycles, said circuit closer arranged to reciprocate said first and second contact arms through a portion of each cycle determined by the position of said first and second members respectively, an electric circuit for said first winding including said first contact arm and said circuit closer whereby said first winding is energized for the portion of each cycle during which said first contact arm is reciprocated by said circuit closer, an electric circuit for said opposed winding including said second contact arm and said circuit closer whereby said opposed winding is energized for the portion of each cycle during which said second contact arm is reciprocated by said circuit closer whereby said motor is urged to rotation proportional to the difference in time duration of the energization of said windings and said second member is positioned to maintain the time duration of the engagement of said circuit closer with said first and second contact arms equal.

JOHN F. LUHRS.